United States Patent
Naito et al.

(10) Patent No.: US 9,944,776 B2
(45) Date of Patent: Apr. 17, 2018

(54) TRANSPARENT, TOUGH AND HEATPROOF RUBBER COMPOSITION COMPRISING NEODYMIUM-CATALYZED ISOPRENE COMPONENT, AND MANUFACTURING PROCESS FOR THE SAME

(71) Applicant: KRATON POLYMERS U.S. LLC, Houston, TX (US)

(72) Inventors: Fumio Naito, Ibaraki (JP); Yoshikatsu Nakazawa, Ibaraki (JP); Norio Masuko, Ibaraki (JP); Arwin van der Waal, Ammerstol (NL)

(73) Assignee: Kraton Polymers U.S. LLC, Houston, TX (US)

(*) Notice: Subject to any disclaimer, the term of this patent is extended or adjusted under 35 U.S.C. 154(b) by 141 days.

(21) Appl. No.: 14/833,788

(22) Filed: Aug. 24, 2015

(65) Prior Publication Data
US 2016/0060437 A1 Mar. 3, 2016

(30) Foreign Application Priority Data
Aug. 26, 2014 (JP) ................................. 2014-171655

(51) Int. Cl.
*C08L 9/00* (2006.01)

(52) U.S. Cl.
CPC .............. *C08L 9/00* (2013.01); *C08L 2201/10* (2013.01); *C08L 2205/025* (2013.01); *C08L 2312/00* (2013.01)

(58) Field of Classification Search
CPC .. C09L 9/00; C09L 2201/10; C09L 2205/025; C09L 2312/00
See application file for complete search history.

(56) References Cited

U.S. PATENT DOCUMENTS

| RE27,145 E | 6/1971 | Jones |
| 5,405,815 A | 4/1995 | Bell et al. |

| 2003/0187162 A1 | 10/2003 | Rachita et al. |
| 2004/0067380 A1 | 4/2004 | Maeda et al. |
| 2005/0137337 A1 | 6/2005 | Halasa et al. |
| 2014/0058044 A1 | 2/2014 | Liang et al. |

FOREIGN PATENT DOCUMENTS

| CN | 102924767 | | 2/2013 |
| JP | 2002327092 | A | 11/2002 |
| JP | 2002363344 | A | 12/2002 |
| JP | 2003041060 | A | 2/2003 |
| JP | 2003301080 | A | 10/2003 |
| JP | 2005002225 | A | 1/2005 |

OTHER PUBLICATIONS

Friebe, L., Nuyken, O., Werner, O., Neodymium-Based Ziegler/Natta Catalysts and their Application in Diene Polymerization, Adv. Polym. Sci. (2006) 204: 1-154.
Gao, W. and Cui, D., High cis-1,4 Selective Polymerization of Dienes with Homogeneous Ziegler-Natta Catalysts Based on NCN-Pincer Rare Earth Metal Dichloride Precursors, J. Am. Chem. Soc. 2008, 13, 4984-4991.
International Search Report for PCT/US2015/046544, dated Feb. 23, 2016.

*Primary Examiner* — Nathan M Nutter
(74) *Attorney, Agent, or Firm* — Samantha Page; Cantor Colburn LLP

(57) ABSTRACT

In order to provide a rubber composition having high transparency, toughness and heat-resisting property, the present invention can provide a composition comprising a neodymium-catalyzed isoprene rubber (IR) component; and a rubber polymer (RB) component selected from the group consisting of BR, 1,2-polybutadiene rubber, and SBR, wherein the amount of IR is from about 5 to 95 mass parts with the proviso that the total amount of IR and RB is 100 mass parts, wherein the composition is substantially free of silica, wherein the composition has haze of less than about 20%, and wherein the composition has Type A Durometer hardness (0 sec) of about 30 or more.

14 Claims, No Drawings

TRANSPARENT, TOUGH AND HEATPROOF RUBBER COMPOSITION COMPRISING NEODYMIUM-CATALYZED ISOPRENE COMPONENT, AND MANUFACTURING PROCESS FOR THE SAME

TECHNICAL FIELD

The present invention relates to a transparent rubber composition comprising a neodymium-catalyzed isoprene component (i.e., a polyisoprene component prepared by using a neodymium-containing catalyst). The present invention also relates to a manufacturing process of the rubber composition, and an article including the composition.

BACKGROUND OF THE INVENTION

A transparent material is a material through which visible light passes. A transparent material has a unique benefit that you can see through the material. A material cannot acquire transparency a posteriori by coloring. An a priori transparent material has been studied and developed in various industrial and artistic fields.

Since a transparent material can be applied in a wide range of uses, the transparent material has been required to have any of various properties as well as an opaque material. The conventional transparent or semi-transparent materials however fail to meet a requirement for strength or toughness on an article such as shoes and tires in practice.

In addition, a so-called transparent material may actually have various transparency. In the case that a material is muddy or hazy, the material would be unsuitable for preparing a transparent and aesthetic material.

Japanese laid-open patent application No. 2003-301080 discloses a transparent crosslinked rubber composition comprising ethylene/alpha-olefin/non-conjugated polyene copolymer rubber, ethylene/polar monomer copolymer, and silica.

Adding silica for strength of a material, however, has been known to impair the transparency of the material. A silica-containing material is sometimes called as transparent material, but indeed the material is clouded or yellowed. In addition, a silica-containing material requires a complicated process to disperse silica in order to improve its transparency.

A silicon-based material such as silicone resin and silica-containing resin generally needs oil as a softener to have flexibility. The more flexibility a silicon-based material has, the more oil is needed. Oil in a silicon-based material however leads to a "bleeding" over time, and its use has been actually restricted.

Japanese laid-open patent application No. 2005-002225 discloses a transparent composition comprising a rubber polymer containing two components having different refractive indices, and wet silica. Indeed the composition has an insufficient transparency, and cannot overcome the defects of conventional art. The prior composition also has the defects of silica.

Japanese laid-open patent application Nos. 2002-327092, 2002-363344 and 2003-041060 disclose crosslinked polybutadiene compositions. The conventional compositions are mere good in coloration, and cannot contribute to transparency.

Even though there has been many prior studies and demands in the field, the skilled artisan has not developed yet a composition having both high transparency and rubber properties such as hardness and strength. The fact is evidence of great difficulties to achieve the combination of the properties at higher level in a good balance.

In addition, if a conventional composition seems to have some transparency, it is often weak to heat. Such a material will deteriorate and lose its transparency by heating, and cannot be actually used in an article which is put under a severe condition (e.g., outdoor use or sterilization).

In general terms, it has been known in the art since earlier times that a catalyst including some alkali metals, alkali earth metals and transition metals may be used in some reactions for preparing olefins. But specific studies are still developing now in the art to verify which metal is actually suitable to be included in a catalyst to prepare which olefin.

Polyisoprene rubber (i.e., a polymer of 2-methyl-1,3-butadiene) is one of polyolefins. In the art it may be simply referred as "isoprene (component)" or "IR (component)". Most of conventional polyisoprene rubbers have cloudy or hazy appearances in practice—even though some suppliers advertize that they are "transparent". The conventional polyisoprenes are also generally weak to heat.

The conventional polyisoprene rubbers have been manufactured by using some conventional Ziegler-Natta catalysts or conventional catalysts including some alkaline metals or alkali earth metals such as calcium. The conventional metal-containing catalysts, however, often lead to an issue that the final composition contains some metal residues. Since articles that are configured to touch to human body are generally controlled by strict regulations, you cannot easily use the conventional metal-containing catalysts to meet the needs of the market.

Neodymium is one of rare earth metals and the 60th element of the Periodic Table, and belongs to lanthanoid. Neodymium has been used as a raw material for magnets, superconductors, and misch metals, but has not well known in the art of catalyst for olefin synthesis.

In the art of olefin synthesis, there are some catalysts including neodymium catalyst for polybutadiene synthesis; but there is only a few reports regarding polyisoprene synthesis Europe Patent No. 2,650,313, U.S. Pat. Publ. No. 20050137338, Henk van de Weg, R&TS Note KRTS 108 2011, Lars Friebe et al., Advances in Polymer Science, Vol. 204, 2006, pp. 1-154 and Wei Gao et al., J. Am Chem. Soc., 2008, 130 (14), pp. 4984-4991). In the few conventional studies, neodymium is not specifically stressed and is merely bundled with other transition metals. There is no prior study to particularly focus on any unique nature of neodymium for polyisoprene synthesis.

SUMMARY OF THE INVENTION

Technical Problem

In view of the aforementioned defects of the conventional art, the present invention now provides a rubber composition having both excellent transparency, strength and heat-resistance, and a manufacturing process thereof, and then meets the needs raised from market users.

Solution to the Problem

An embodiment of the present invention provides a transparent, crosslinked rubber composition, comprising:
a neodymium-catalyzed isoprene rubber (IR) component; and
a rubber polymer component selected from the group consisting of butadiene rubber (BR), 1,2-polybutadiene rubber, and styrene butadiene rubber (SBR), wherein the amount of the neodymium-catalyzed isoprene rubber is from about 5 to 95 mass parts, preferably about 10 to 95 mass parts, more preferably about 25 to 95 mass parts, with the proviso that the total amount of the neodymium-catalyzed isoprene rubber and the rubber polymer component is 100 mass parts, wherein the composition is substantially free of silica, wherein the composition has haze of less than about 20%, preferably about 18% or less, more preferably about 15% or less, on 2 mm thick sheet, measured according to JIS K7136, and wherein the composition has Type A Durometer hardness (0 sec) of about 30 or more, preferably about 30 to 70, more preferably about 40 to 70, measured according to JIS K6253.

Another embodiment of the present invention provides a process for manufacturing a transparent, crosslinked rubber composition, being substantially free of silica, the process comprising the acts of:

providing a neodymium-catalyzed isoprene rubber polymer having the refractive index of between about 1.500 to 1.525 at 23 degree C.;

providing a rubber polymer selected from the group consisting of butadiene rubber, 1,2-polybutadiene rubber, and styrene butadiene rubber, wherein the rubber polymer has the refractive index of between about 1.500 to 1.525 at 23 degree C.;

mixing the neodymium-catalyzed isoprene rubber polymer and the rubber polymer such that the amount of the neodymium-catalyzed isoprene rubber polymer is from about 5 to 95 mass parts, preferably about 10 to 95 mass parts, more preferably about 25 to 95 mass parts, with the proviso that the total amount of the neodymium-catalyzed isoprene rubber polymer and the rubber polymer is 100 mass parts, to obtain a mixture thereof;

adding a crosslinker to the mixture; and uniformly kneading the mixture.

Advantageous Effects of the Invention

The present rubber composition can solve the defects of conventional compositions, and can surprisingly have excellent transparency, strength and heat-resistance in a good balance.

DESCRIPTION OF THE EMBODIMENTS

Embodiments of the present invention will be explained in detail, but the present invention is not limited to the embodiments.

Definitions

The term of "transparent" means that a transmitted light passed through an article is mainly comprised of specular transmission, where the ratio of specular-transmitted visible light is large. The degree of transparency is determined, in the present application, from value of haze or total luminous transmittance. An article which lacks "transparency" defined above, can be called as "opaque" or "semi-transparent".

The term of "haze" means the degree of dimness in a transparent material, measured according to JIS K7163 (or ISO 14782). The value of haze is determined as a percent of transmitted light which strays from the incident light in the angle of 0.044 rad or more by forward scattering.

The term of "TT" which stands for "total luminous transmittance" means the ratio of light beam passed through a transparent material, measured according to JIS K7361-1 (or ISO 13468-1). The value of total luminous transmittance is determined as the ratio of total transmitting light flux with respect to parallel incident light flux on a test article.

The term of "Type A Durometer Hardness" or "Hs" means the hardness of a rubber composition measured according to JIS K6253. The value of Hs is determined, in the present specification, from the following procedure: constantly pushing a plunger onto a test article, and measuring the depth of the pushed plunger in the article at 0 sec or 30 sec after the pushing.

The term of "tear strength" means the tear strength of a rubber composition measured according to JIS K6252. The value of tear strength is determined, in the present specification, by using a 2 mm-thick sheet of a test material, and converted in N/mm unit.

The term of "tensile at break", "tensile", or "Tb" means the maximum stress at a fracture of a test strip which is stretched at a constant rate, measured according to JIS K6252. In the present specification, the value of tensile is calculated by dividing the maximum stress subjected on a test strip by the original cross-sectional area of the strip, and converting the resulted value into MPa unit.

The term of "elongation at break", "elongation", or "Eb" means a deformation along the stretching (length) axis on a strip which is stretched, measured according to JIS K6251 (ISO37). In the present specification, the value of elongation is represented as the ratio of the elongated length of the strip to the original length of the strip in percentage form.

The term of "tensile stress" or "modulus" means the stress when a test strip is elongated for a given length, measured according to JIS K6251 (ISO37). In the present specification, the value of modulus is calculated by dividing the load on a test strip which is elongated for a given length by the cross-sectional area of the strip, and converting the resulted value into MPa unit. Modulus at 100%, 300%, or 500% of elongation may be represented as "M100", "M300", or "M500", respectively.

The term of "Mooney viscosity" means the viscosity of a unvulcanized rubber measured according to JIS K6300-1. The value of Mooney viscosity is measured, in the present specification, by a Mooney viscometer fitting the standard in JIS K6300-1.

The term of "refractive index" means an index representing the speed of light in a substance, e.g. measured according to JIS K7142.

The term of "vinyl content" refers to the amount of a conjugated diene which is polymerized via 1,2-addition (in the case of butadiene-it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The result of the addition above, a pendant vinyl group on the polymer skeleton will be produced. The vinyl content in a polymer may be measured using a conventional technique in the art such as proton NMR.

The vinyl content is effectively controlled by varying the relative amount of the distribution agent. As will be appreciated, the distribution agent serves two purposes—it creates the controlled distribution of the mono alkenyl arene and conjugated diene, and also controls the microstructure of the conjugated diene. Suitable ratios of distribution agent to lithium are disclosed and taught in U.S. Pat. No. Re 27,145, which disclosure is incorporated by reference.

The terms of "plasticizer oil", "plasticizer", and "softener" mean an oil-based compound known as an additive for changing properties of a material in the art. The plasticizer may include, but not limited to, paraffin oil, mineral oil, ester oil, hydrocarbon-based synthetic lubricating oils, naphthenic oils, and vegetable oils.

As used herein, unless otherwise noted, the term "molecular weight(s)" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also known as apparent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights". When expressed as apparent molecular weights they are similarly determined with the exception that consideration of the block copolymer composition and the subsequent conversion to true molecular weights is not done.

The words of "comprising", "including", and "containing" mean in the present specification, unless otherwise noted, that an article or component connotes or has an element(s). The spirit of the words may embrace both an internal and external addition.

In the case that the word of "about", "around", or "appropriately" is prefixed to a value, in the present specification, the value can include a tolerance of at least plus/minus 10 percent.

Outline of Olefin Polymers

Olefin polymers mean a polymerized olefin(s), and include diene polymers and non-diene polymers. The olefin polymer may also include thermoplastic elastomers (TPEs). The composition according to the present embodiments may include at least two olefin polymers.

The term of "polymer" in the present specification can include, unless otherwise noted, both a vulcanized polymer and a non-vulcanized polymer.

The olefin polymer may include a conjugated olefin polymer and a non-conjugated olefin polymer. The term of "conjugated olefin polymer" means a polymer of olefin(s) having double bonds set apart from each other by separated by generally at least two single bonds.

The olefin polymer may be prepared, but not limited to, from $C_4$ to $C_{20}$ olefin (including diolefin and alpha-olefin), preferably $C_4$ to $C_{12}$ olefin, more preferably $C_4$ to $C_8$ olefin.

The conjugated and non-conjugated olefin may include, but not limited to, 1,2-butadiene, 1,3-butadiene, 2-methyl-1,3-butadiene (i.e., isoprene), 2,3-dimethyl-1,3-butadiene, 1,3-pentadiene, 4-methyl-1-pentene, 1,3-hexadiene, 1,4-hexadiene, 1,3-heptadiene, 4,6-dimethyl-1-heptene, 1,3-octadiene, 1,7-octadiene, 1,3-nonadiene, 1,3-decadiene, 1,9-decadiene, 1,3-dodecadiene, cyclopentene, cyclohexene, cyclooctene, dicyclopentadiene, norbornene, 5-ethylidene-2-norbornene, 5-vinylidene-2-norbornene, and 5-methylene-2-norbornene. The olefin polymer can have any number average molecular weight, but may have 100 g/mol to 100,000 g/mol of number average molecular weight, for instance.

The olefin polymer may also include vinyl aromatic hydrocarbons such as styrene, o-methylstyrene, p-methylstyrene, p-tert-butylstyrene, 2,4-dimethylstyrene, alpha-methylstyrene, vinyl naphthalene, vinyl toluene, vinyl xylene, and mixtures thereof.

The term of "diene polymer" means a kind of olefin polymers. A diene polymer is made from a polymerization of hydrocarbon having two double bonds. The diene polymer may include, but not limited to, isoprene rubber (IR), butadiene rubber (BR), 1,2-polybutadiene rubber (or 1,2-polybutadiene elastomer), styrene-butadiene rubber (SBR), acrylonitrile butadiene rubber (NBR), hydrogenated nitrile rubber (HNBR), chloroprene rubber (CR), and any grade of natural rubber (NR), and may further include any polymers prepared from any diene hydrocarbons known in the art. In the present specification, a polymer which is a rubber may be referred as to "rubber polymer". The term of "olefin polymer(s)" may mean, in the present specification, both a neodymium-catalyzed isoprene component and a rubber polymer component included in a composition according to the present embodiments.

The diene polymer may include, of course, conjugated and non-conjugated diene polymers. The conjugated diene polymer may include, but not limited to, ethylene/alpha-olefin copolymers, ethylene/styrene copolymers, and ethylene/conjugated diene copolymers. The non-conjugated diene polymer may include ethylene/non-conjugated diene copolymers.

The term of "non-diene polymer" means a polymer in which its unit lacks two double bonds. The non-diene polymer may include, but not limited to, butyl rubber (IIR), fluorine rubber (FKM), ethylene-propylene rubber (EPM), ethylene-propylene-diene rubber (EPDM), and urethane rubber (U), and may further include any polymers prepared from any hydrocarbons known in the art.

Even though the non-diene polymer lexically includes silicone rubber (Q), the silicone rubber would lead to the issue illustrated in the Background section above. Note that, however, the present embodiments do not absolutely exclude a trace of silicone rubber or silica which has little impact on properties of the whole composition. In other words, the phrase of "being substantially free of silica" does not exclude non-substantial use of silica (e.g., those inevitably incorporated in a composition during a manufacturing process).

The diene or non-diene polymers may have some geometrical isomers. The cis content (ratio) of the isomers may affect the properties. The cis content may be measured by the IR spectroscopy according to JIS 6230 or ISO 4650.

The degree of cis content depends on a kind of polymer. For instance, in the case of polyisoprene, "low-cis" diene polymer may have from about 90% to about 95% of cis content, more typically from about 90% to about 94% of cis content, and more further typically from about 90% to about 92% of cis content; and "high-cis" diene polymer may have more than about 95% of cis content, typically from about 95% to about 99% of cis content, and more typically from about 96% to about 99% of cis content.

In the case of polybutadiene rubber (BR), "low-cis" rubber may have from about 20% to about 40% of cis content; "high-cis" rubber may have from about 94% to about 98% of cis content; and "modest-cis" rubber may have an intermediate cis content.

The high-cis diene polymer may include, but not limited to, LHIR-80 (neodymium-catalyzed high-cis polyisoprene rubber manufactured by Moaming Luhua; Mw: about 1800 to 2100 kg/mol; cis content: about 96 to 97%), LHIR-90 (neodymium-catalyzed high-cis polyisoprene rubber manufactured by Moaming Luhua; refractive index at 23 degree C.: 1.519), Nipol IR2200 (non-neodymium-catalyzed, Ziegler-Natta catalyzed high-cis polyisoprene rubber manufactured by ZEON; Mw: about 1700 kg/mol; cis content: about 98.5%; Mooney viscosity: 82; refractive index at 23 degree C.: 1.519), and Nipol IR2200L (non-neodymium-catalyzed, Ziegler-Natta catalyzed high-cis polyisoprene rubber manufactured by ZEON; Mooney viscosity: 72).

The low-cis or modest-cis diene polymer may include, for instance, Cariflex IR0307 and Cariflex IR0310 (lithium-catalyzed polyisoprene manufactured by Kraton Polymers; cis content: about 87% to about 91%; refractive index at 23 degree C.: 1.519), Solprene 255 and Asaprene 755A (styrenic elastomer manufactured by Asahi Kasei), Diene 35NR, Diene 35RNF, Diene 55RNF, Diene 35NF, Diene 55NF, and Diene 51 (modest-cis polybutadiene manufactured by Firestone Polymers; cis content: about 40%; Mooney viscosity: about 35 to about 55), and Nipol BR1241S and Nipol BR1242S (low-cis 1,4-polybutadiene manufactured by ZEON; Mooney viscosity: about 35 to about 55).

The 1,2-polybutadiene may include, but not limited to, JSR RB805, JSR RB810, JSR RB820, JSR RB830, and JSR RB840 (low crystalline syndiotactic 1,2-polybutadiene-based thermoplastic elastomer manufactured by JSR; 1,2-bond content: about 90% to about 96%). The refractive index at 23 degree C. is as following: JSR RB810: about 1.513, JSR RB820: about 1.515, JSR RB830: about 1.517.

The polymer may preferably have low crystallizability to obtain an adequate flexibility. In the case of polybutadiene block copolymer, the ratio of 1,2-addition may preferably be about 30 percent or more to avoid crystallization after hydrogenation, in particular to avoid too much hardness at a lower temperature.

The polymer above may be prepared by using any conventional inert hydrocarbon solvents that have been known to be useful in the art. The appropriate solvent may include, for instance, linear or branched hydrocarbons such as pentane, hexane, heptane, octane, and alkyl-substituted derivatives thereof; aliphatic cyclic hydrocarbons such as cyclopentane, cyclohexene, cycloheptane, and alkyl-substituted derivatives thereof; aromatic hydrocarbons such as benzene, naphthalene, toluene, xylene, and alkyl-substituted derivatives thereof; and hydrogenated aromatic hydrocarbons such as tetralin and decalin.

Unless otherwise noted, the term of "polymer" may also include a modified polymer whose terminus(es) is/are modified by a modifier. The modifier may include, for instance, a compound having one or more functional group(s) selected from amino, amide, alkoxysilyl, isocyanate, imino, imidazole, urea, ether, carbonyl, carboxyl, hydroxyl, nitrile, and pyridyl groups. The modifier may include, but not limited to, 3-(N,N-dimethylamino)propyltrimethoxysilane, 3-(N,N-diethylamino)trimethoxysilane, 3-(N,N-dimethylamino)propyltriethoxysilane, 3-(N,N-diethylaminopropyl)triethoxysilane, 3-glycidoxypropyltrimethoxysilane, 2-(4-pyridylethyl) triethoxysilane, N-(3-triethoxysilylpropyl)-4,5-dihydroimidazole, and silicon tetrachloride.

Neodymium-Catalyzed Polyisoprene Component which May be Contained in the Composition of Present Embodiment The composition according to an embodiment may include a neodymium-catalyzed isoprene rubber component, namely an isoprene rubber prepared by using a neodymium-containing catalyst. The neodymium-containing catalyst may include, but not limited to, metal neodymium, and carboxylates, phosphates, phosphites, alkoxides, and diketone complexes of neodymium. The neodymium-containing catalyst may be used, e.g. in the form of a solution of a hydrocarbon solvent.

The carboxylate of neodymium may include, but not limited to, a compound containing a structure having the residue of carboxylate bound to trivalent neodymium. The carboxylates may preferably be saturated or unsaturated carboxylate having $C_1$ to $C_{20}$ straight- or branched-chain and alkyl or alkenyl group(s). The carboxylates may include, but not limited to, 2-ethyl hexanoic acid, neodecanoic acid, naphthenic acid, oleic acid, stearic acid, and benzoic acid.

The phosphates and phosphites of neodymium may include, but not limited to, neodymium[phosphate bis(2-ethylhexyl)], neodymium[phosphate bis(1-methylheptyl)], neodymium[2-ethylhexylphosphonate mono-2-ethylhexyl], neodymium[bis(2-ethylhexyl)phosphinate], neodymium[bis(1-methyl-heptyl)phosphinate], and neodymium[(2-ethylhexyl)(p-nonylphenyl) phosphinate].

The alkoxides of neodymium may have a structure having alkoxy group bound to trivalent neodymium. The alkoxy group may preferably be $C_1$ to $C_{20}$, and may for instance have a saturated or unsaturated straight-, branched-, or cyclic-skeleton. The alkoxy group may include, but not limited to, 2-ethyl-hexylalkoxy, oleylalkoxy, benzylalkoxy, stearylalkoxy, and phenoxy groups.

The beta-diketone complex of neodymium of course contains a beta-diketone complex part, such as acetylacetone complex, ethylacetylacetone complex, benzoylacetone complex, propionitrileacetone complex, and valerylacetone complex.

The present inventors have found that a polymer prepared by using a neodymium-containing catalyst has very few branches on the carbon chains. This feature also relates to the fact that the polymer has small wet gel content, as described below.

In the prior art, conventional high-cis isoprene rubbers have been prepared by using Ziegler-Natta catalysts. The Ziegler-Natta catalysts however are not dissolved in solvents, and are dispersed as solid particles into a reaction liquid. The dispersed catalyst particles are considered to have some active spots on their surfaces. The active spots are reaction sites of titanium atoms. The polymerization reaction of isoprene monomer may be carried out on the active spots. In this regard, the polymerization reaction proceeds in a plane and the resulted polymer will have many branches—some branches may also form a network. A polymer having many branches leads to an increased amount of gel content. Such a highly-branched polymer chain is easy to wrap up catalyst molecules, and the resulted polymer gel would contain catalyst residue (metal residue) therein. The residue in the gel cannot be sufficiently removed by washing the polymer. (On the other hand, some deactivated catalysts will stay in the solvent, and can be easily washed out.)

The present inventors, however, have surprisingly found that a polymer prepared by using a neodymium-containing catalyst has very few branches. The detailed reaction mechanism on a neodymium-containing catalyst has not been academically clarified yet; but without wishing to be bound by any theory, the present inventors assume that such a low-branched polymer chain hardly embraces the catalyst molecules. The catalyst residue is considered to be easily washed out if the polymer is sufficiently washed at the finishing stage. In other words, the catalyst residue is not captured in the polymer, and then the amount of residue can be reduced by adding a washing stage or optimizing the washing conditions.

In addition, a polymer having a large amount of gel content is generally weak to frictions, and has poor mechanical properties. The present neodymium-catalyzed polyisoprene is superior to the conventional polymer in this regard.

In an embodiment, the neodymium-catalyzed polyisoprene may preferably be high-cis, and may have 95% or more, preferably from 95 to 99%, more preferably from 96 to 99% of cis content. High-cis polyisoprenes are industrially preferred, since they have excellent heat-resistance and their manufacturing cost is relatively low. But in another embodiment, the present composition may include low- or modest-cis neodymium-catalyzed polyisoprenes.

Note that the conventional high-cis polyisoprenes, prepared by not using a neodymium catalyst, have certain drawbacks that they generally tend to have strain-induced crystallization and then have poor transparency. But the present inventors have surprisingly found that neodymium-catalyzed polyisoprenes exert slow crystallization rate even though they are high-cis, and have good transparency. The present inventors have conceived and completed the present invention on the basis of the discovery.

Rubber Polymer Component which May be Contained in the Composition of Present Embodiment The composition according to an embodiment may include a rubber polymer component such as butadiene rubber (BR), 1,2-polybutadiene rubber, and styrene-butadiene rubber (SBR). These rubbers have similar properties, and may be adequately softened if they are mixed with a polyisoprene rubber to exert suitable properties. In an embodiment, the rubber polymer may preferably be syndiotactic 1,2-polybutadiene or low-cis BR. In particular, those having a syndiotactic structure is preferred since the structure may contribute toward heat resistance.

In another embodiment, the rubber polymer may be a diene polymer other than above, but the resulted composition might not have suitable properties. For instance, using EPDM may lead to a problematic phase separation if the ratio of EPDM is large, since EPDM has a considerably different refractive index from polyisoprene, and poor blend-ability with polyisoprene. In addition, natural rubbers are originally colored and may be harmful to transparency.

Without wishing to be bound by any theory, the present inventors assume that the mixture of a neodymium-catalyzed polyisoprene and the preferred rubber polymer above can inhibit the crystallization rate of the neodymium-catalyzed polyisoprene which is originally slow as illustrated above. The resulting composition is thus able to surprisingly reduce the haze.

Crosslinkers

The present composition may preferably be finalized to be a final product by crosslinking the mixture of at least two olefin polymers with a crosslinker or vulcanizer. The crosslinker or vulcanizer may include, for instance, sulfur, sulfur-containing compounds, radical crosslinking agents, and peroxides.

The radical crosslinking agent may include, but not limited to, ethylene glycol methacrylate (EGDMA), trimethylolpropane methacrylate, triallyl isocyanurate, triallyl cyanurate, diethylene glycol diacrylate, and neophenylene glycol diacrylate.

The peroxide may include, but not limited to, one or more selected from the group consisting of 2,5-dimethyl-2,5-di-(t-butylperoxy)hexane, dicumyl peroxide, benzoyl peroxide, 1,1-bis-(t-butylperoxy)-3,5,5-trimethylcyclohexane, diisobutyryl peroxide, cumylperoxy neodecanoate, di-n-propylperoxy dicarbonate, di-isopropyl peroxy dicarbonate, di-sec-butylperoxy dicarbonate, 1,1,3,3-tetramethyl-butylperoxy neodecanoate, di-(4-t-butylcyclohexyl)peroxy dicarbonate, di(2-ethylhexyl)peroxy dicarbonate, t-hexylperoxy neodecanoate, t-butylperoxy neodecanoate, t-butylperoxy neoheptanoate, t-hexylperoxy pivalate, t-butylperoxy pivalate, di(3,5,5-trimethyl-hexanoyl) peroxide, dilauroyl peroxide, 1,1,3,3-tetramethyl-butylperoxy-2-ethylhexanoate, disuccinic acid peroxide, 2,5-dimethyl-2,5-di(2-ethylhexanoylperoxy)hexane, t-hexylperoxy-2-ethylhexanoate, di(4-methyl-benzoyl) peroxide, t-butylperoxy-2-ethylhexanoate, di(3-methyl-benzoyl) peroxide, benzoyl(3-methyl-benzoyl) peroxide, dibenzoyl peroxide, 1,1-di(t-butylperoxy)-2-methyl-cyclohexane, 1,1-di(t-hexylperoxy)-3,3,5-trimethylcyclohexane, 1,1-di(t-hexylperoxy)cyclohexane, 1,1-di(t-butylperoxy)cyclohexane, 2,2-di(4,4-di(t-butylperoxy)cyclohexyl)propane, t-hexylperoxyisopropyl monocarbonate, t-butylperoxy maleic acid, t-butylperoxy-3,5,5-trimethyl hexanoate, t-butylperoxy laurate, t-butylperoxyisopropyl monocarbonate, t-butylperoxy-2-ethylhexyl monocarbonate, t-hexylperoxy benzoate, 2,5-dimethyl-2,5-di(benzoylperoxy)hexane, t-butylperoxy acetate, 2,2-di-(t-butylperoxy)butane, t-butylperoxy benzoate, n-butyl-4,4-di-(t-butylperoxy) valerate, di(2-t-butylperoxyisopropyl)benzene, di-t-hexyl peroxide, t-butylcumyl peroxide, di-t-butyl peroxide, p-menthane hydroperoxide, 2,5-dimethyl-2,5-di(t-butylperoxy)hexyne-3, diisopropylbenzene hydroperoxide, 1,1,3,3-tetramethyl-butyl hydroperoxide, cumene hydroperoxide, and t-butyl hydroperoxide.

The composition of the present embodiments may be prepared, for instance, by adding one or more of the crosslinkers above in the amount of 0.1 to 10 mass parts, preferably 0.2 to 8.0 mass parts, more preferably 0.5 to 6.0 mass parts with respect to 100 mass parts of the olefin polymer component. In still another embodiment of the present invention, the crosslinker may be added in another amount.

In the process for preparing the composition of the present embodiments, the crosslinker may preferably be peroxide in view of low contamination in a resulted product. More preferably, the peroxide may be, but not limited to, PERHEXA(R) 25B, PERHEXA(R) 25B-40, or PERHEXA(R) 25B-40 MB (2,5-dimethyl-2,5-di(t-butylperoxy)hexane manufactured by NOF Corporation), in order to suppress malodor and residue amount.

Additional Components

The composition of the present embodiments may further include additional components or additives as long as the component(s) severely spoil the transparency. The additional component may include, but not limited to, colorants, modifiers, finishing agents (e.g., lauric acid), antioxidants (e.g., monophenol, bisphenol, polyphenol, sulfur, phosphorus-based compounds such as Irganox 1010, Irganox 1726, Irgafos 168, and Irganox PS800 manufactured by BASF), reducing agents, oxygen scavengers, light stabilizers, antacids, pH stabilizers, surface treatment agents, heat stabilizers, colorants, fillers (e.g., talc, calcium carbonate, and carbon black), surfactants, gelling agents, biocides, UV absorbents (e.g., salicylic acid, benzophenone, benzotriazole, cyanoacrylate, and hindered amine), dusting agents (e.g., polyolefin such as polyethylene, silica, talc, calcium carbonate powder), flame retardants, and polyphosphoric acid.

The colorant may be used such that the composition has transparent or translucent coloring such as clear blue, clear red, and clear green. The colorant may include any conventional colorants used in the art, such as color pigments, extender pigments, anti-corrosive pigments, and functional pigments (e.g., phthalocyanine green, titanium, iron blue, iron oxide, lead suboxide, and zinc sulfide).

The composition of the present embodiments may include, for instance, about 0.10 to about 10.0 mass parts of the additional components, preferably about 0.20 to about 5.00 mass parts of the additional components, and more preferably about 0.25 to about 2.00 mass parts of the additional components with respect to 100 mass parts of the olefin polymer. In still another embodiment of the present invention, the additional components may be added in another amount.

Transparent Composition

The transparent composition of the present embodiment may preferably have less than about 20% of haze, preferably about 18% of haze, more preferably about 15% or less of haze, more further preferably about 10% or less of haze in view of enough transparency. If the haze is about 20% or more, the transparency of the composition will be too low to meet the practical and aesthetic needs of the market.

A transparent composition according to an embodiment may have about 0.5 MPa or more of modulus, more preferably about 1.0 MPa or more, more preferably about 2.0 MPa or more, in view of enough mechanical properties. If the modulus is too low (e.g., in the case that M100 is less than about 0.5 MPa), the composition may lack enough mechanical properties.

The composition according to an embodiment may have about 30 or more of Type A Durometer hardness, preferably from about 30 to 70, more preferably from about 40 to 70, and more further preferably from 50 to 70. In the case that the present composition is incorporated to a product to be used under a severe environment, such as footwear (e.g., shoe sole) and rubber tire, the Type A Durometer hardness may preferably be around 60 to 70. The present composition may preferably have Type A Durometer hardness measured at 30 seconds which is about 80% or more of Type A Durometer hardness measured at 0 second, preferably about 90% or more of of Type A Durometer hardness measured at 0 second, more preferably about 95% or more of of Type A Durometer hardness measured at 0 second.

In an embodiment, the present composition may have the tensile at break (Tb) of about 1.5 MPa or more, preferably about 2.0 MPa to 15 MPa, more preferably about 3.0 MPa to 15 MPa, still more preferably about 5.0 MPa to 15 MPa. If Tb is too low (e.g., less than about 1.5 MPa), the composition may be too fragile to stand an external force.

In an embodiment, the present composition may have the elongation at break (Eb) of about 150% or more, preferably about 200% or more, more preferably about 250% or more, still more preferably about 300% or more. If Eb is too low (e.g., less than about 150%), the rubber composition may lack enough elasticity.

In an embodiment, the present composition may have the tear strength of about 10 N/mm or more, preferably from about 10 N/mm to 50 N/mm, more preferably from about 20 N/mm to 50 N/mm, measured using a 2 mm-thick sample sheet according to JIS K6252. If the tear strength is too low (e.g., less than about 10 N/mm), the composition may lack enough durability.

In an embodiment, the present composition may preferably have low metal trace contents such as Fe, Li, Al, Nd, and Ti, particularly in the case that the product directly touches a body (e.g., medical use). For instance, the composition of an embodiment may be prepared by using a neodymium-catalyzed polyisoprene having about 10000 ppm or less, preferably about 1000 ppm or less, more preferably about 100 ppm or less, still more preferably about 10 ppm or less for each metal element (e.g., Fe, Li, Al, Nd, or Ti) in terms of metal atom. If the composition contains too much metal(s), the product may not be industrially or commercially suitable under the environmental standard and/or health standard. For instance, if the amount of Fe (iron) is too high, the resulted composition may be colored in brown or dark brown, and have poor transparency.

In an embodiment, the present composition may include the second olefin polymer such that the absolute value of the difference between the refractive indices of the neodymium-catalyzed isoprene rubber (IR) component and rubber polymer component in the present composition may be about 0.100 or less, preferably about 0.050 or less, more preferably about 0.020 or less, still more preferably about 0.010 or less, about 0.005 or less, about 0.002 or less, or about 0.001 or less.

In an embodiment, the present composition may include both a neodymium-catalyzed isoprene rubber (IR) ingredient and a rubber ingredient selected from butadiene rubber (BR), 1,2-polybutadiene rubber, and styrene butadiene rubber (SBR). In one aspect of the embodiment, the amount of the neodymium-catalyzed isoprene rubber ingredient may be from about 5 to 95 mass parts, preferably from about 10 to 95 mass parts, more preferably from about 25 to 95 mass parts, and still more preferably from about 30 to 90 mass parts, with the proviso that the total amount of the neodymium-catalyzed isoprene rubber ingredient and the rubber polymer ingredient is 100 mass parts.

In an embodiment, the present composition may be substantially free of oil as a softener to avoid oil bleeding.

In an embodiment, the present composition may have about 88% or more, preferably about 89% or more, more preferably about 90% or more, still more preferably about 91% or more of total luminous transmittance measured according to JIS K7361-1. If the total luminous transmittance is less than about 88%, the composition will lack enough transparency.

Manufacturing Procedure

In an embodiment, the composition may be prepared by the process comprising the steps of: providing a neodymium-catalyzed isoprene rubber polymer having the refractive index of between about 1.500 to 1.525 at 23 degree C.; providing a rubber polymer selected from the group consisting of butadiene rubber, 1,2-polybutadiene rubber, and styrene butadiene rubber, wherein the rubber polymer has the refractive index of between about 1.500 to 1.525 at 23 degree C.; mixing the neodymium-catalyzed isoprene rubber polymer and the rubber polymer such that the amount of the neodymium-catalyzed isoprene rubber polymer is from about 5 to 95 mass parts with the proviso that the total amount of the neodymium-catalyzed isoprene rubber polymer and the rubber polymer is 100 mass parts, to obtain a mixture thereof; adding a crosslinker to the mixture; and uniformly kneading the mixture.

The composition of the present embodiments may be used in any industrial fields that can utilize its high transparency. The industrial use may include, but not limited to, footwear products, tires, clothes, masks, medical masks, eyewear, medical goggles, medical air tents, rain gear, toys, damping materials, building components, coating material for wiring, packaging materials, protection members for computers, computer peripherals, contraceptive devices, sex toys, artificial nipple, disposable diapers, stationery, containers, food trays, balls for sports, ball chairs, and protective films.

The composition of the present embodiments may be used to manufacture footwear products such as shoe sole, tip, ornament, tongue and other parts having high transparency and strength that cannot be produced by the conventional technique. The present composition may also be used to prepare a shoe which is all transparent. The footwear above can have both practicability and aesthetic design, and will be commercially worthwhile. Like the other use, being substantially free of oil can avoid the issue of oil bleeding and damages on other parts. It is greatly advantageous in the art.

The composition of the present embodiments may be used to prepare an esthetical rubber tire which has strength and transparency. For instance, the tire may be a stylish one for bikes or automobiles. A rubber tube may also be manufactured in a similar manner.

The composition of the present embodiments may also be used for manufacturing clothes and underclothes, rain gears, masks such as masks for preventing hay fever, or eyewear such as protective glasses for welding, goggles for cycling or swimming, and protective eyewear for chemical experiments such that the products can have a highly tough and transparent portion(s) therein. The products can be practically useful to see through them, and can both have aesthetic design and long lifetime.

In the field of medical use, the composition of the present embodiments may also provide medical masks, medical goggles, or medical air tents that would meet the environmental standard, due to the low amount of metal contents.

The composition of the present embodiments may also be used for preparing a damping or building material having excellent aesthetic transparency as well as exerting high durability or damping properties.

The composition of the present embodiments may also be used for preparing a coating material for wiring or a packaging material such that one can easily see the interior through the material having high insulation quality.

The composition of the present embodiments may also be used for manufacturing toys such as a plastic model, small scale production model kit, and die-cast toy car, artificial nipple, or disposable diapers. The product may be at least partially transparent, and safe even if an infant puts it in his mouth.

The composition of the present embodiments may also be used instead of silicone resin, for manufacturing contraceptive devices (e.g., condom and pessary), sex toys (e.g., life-size dolls and dildoes), protective members for computers (e.g., jackets for smart phones), computer peripherals (e.g., keyboards and mice), containers, food trays, balls for sports, and ball chairs. The products may be partially or wholly transparent to meet design requirements, and still have an equivalent usability to the conventional one. The products can prohibit the issue of oil bleeding, and be safe in health care even if the product touches a human body, and have good durability.

Note that the aforementioned applications are mere examples of the present embodiments, the present embodiments shall not be limit to those applications.

EXAMPLES

Embodiments of the present invention will now be further illustrated with reference to the following working examples, comparative examples, and reference examples; however, without restricting its scope to these embodiments.

Example 1

1st Step: A bulk (50 grams (g)) of high-cis polyisoprene rubber (LHIR-80 manufactured by Moaming Luhua) was pressed by a 5-inch open roller (manufactured by Yasuda Seiki, roller temperature: 70 degree C., rotation speed ratio: 1:1.25).

2nd Step: The temperature of the roller was increased to 100 degree C. 50 grams of 1,2-polybutadiene (RB-820 manufactured by JSR; crystallinity: 25%) was hung on the roller, and then pressed and wrapped onto the roller.

3rd Step: The pressed polyisoprene rubber (resulted from Step 1) and 0.25 gram of lauric acid was simultaneously added to the roller wrapped with the 1,2-polybutadiene, and then the materials were uniformly kneaded.

4th Step: The uniformly-kneaded rubber was removed from the roller, and then the temperature of the roller was cooled down to 70 degree C.

5th Step: The rubber removed at Step 4 was wrapped again onto the roller at 70 degree C. Then 0.5 gram of 2,5-dimethyl-2,5-di(t-butylperoxy)hexane (PERHEXA(R) 25B manufactured by NOF Corporation) as a crosslinker was added to the rubber. The mixture was uniformly kneaded.

6th Step: The kneaded rubber was cut off from the roller to a sheet having 3 mm to 4 mm thickness. The sheet was aged at room temperature for one day and night.

7th Step: The aged rubber was cured or vulcanized by a 36-ton two-stage heating and cooling press machine (manufactured by KANSAI ROLL Co., Ltd.) at the temperature of 160 degree C. and the pressure of 15 MPa for 6 minutes to obtain Example 1 of rubber composition.

The resulted rubber composition was subjected to the test procedures to measure haze, TT, Hs, Tb (tensile), modulus, Eb (elongation), and tear strength at room temperature (RT). Then the composition was put into an oven at 70 degree C., and the properties were further measured at 24, 48, and 72 hours. Haze and TT were measured using a 2 mm-thick sample sheet.

Additional Note: In Step 4, removing the rubber from the roller aimed to avoid three issues shown below.

At first, if the rubber is left on the roller, the cooling period will be too much to knead the rubber, and then too much molecular chains of the rubber will be cut and the properties will be deteriorated.

Secondly, if the roller is stopped with leaving the rubber on it, re-starting the roller will be disturbed by the cooled rubber having higher viscosity, and then too much force may be dangerously applied to the roller.

Lastly, if the roller is still wrapped with the rubber at the cooling step, the rubber works as a thermal insulator and will take a long time for cooling down.

Formulations and properties of Example 1 and the other examples were illustrated in the tables below.

Example 2

The rubber composition of Example 2 was prepared by the same process as Example 1 except for using 70 grams of LHIR-80 at Step 1, using 30 grams of RB-820 at Step 2, and that the vulcanization period was 9 minutes at Step 7.

Example 3

The rubber composition of Example 3 was prepared by the same process as Example 1 except for using 90 grams of LHIR-80 at Step 1, using 10 grams of RB-810 (manufactured by JSR; crystallinity: 18%) instead of RB-820 at Step 2, using 0.8 gram of PERHEXA(R) 25B at Step 5, and that the vulcanization period was 10 minutes at Step 7.

Example 4

The rubber composition of Example 4 was prepared by the same process as Example 1 except for using 30 grams of LHIR-80 at Step 1, and using 70 grams of RB-820 at Step 2. The properties of Examples 4 to 8 were measured at room temperature only.

Example 5

The rubber composition of Example 5 was prepared by the same process as Example 1 except for using 50 grams of RB-830 (manufactured by JSR; crystallinity: 29%) instead of RB-820 at Step 2.

Example 6

The rubber composition of Example 6 was prepared by the same process as Example 5 except for using 70 grams of LHIR-80 at Step 1, using 30 grams of RB-830 at Step 2, and that the vulcanization period was 8 minutes at Step 7.

Example 7

The rubber composition of Example 7 was prepared by the same process as Example 1 except for using 50 grams of Diene NF35NR (low-cis butadiene rubber manufactured by Firestone Polymers; amorphous) instead of RB-820 at Step 2, and using 0.8 gram of PERHEXA(R) 25B at Step 5.

Example 8

The rubber composition of Example 8 was prepared by the same process as Example 7 except for using 70 grams of LHIR-80 at Step 1, using 30 grams of Diene NF35NR at Step 2, and that the vulcanization period was 8 minutes at Step 7.

COMPARATIVE EXAMPLES

Comparative Example c1

The rubber composition of Comparative Example c1 was prepared by the same process as Example 1 except for using 50 grams of Nipol IR2200 (Ziegler-Natta catalyzed, high-cis polyisoprene manufactured by ZEON) instead of LHIR-80 at Step 1.

Comparative Example c2

The rubber composition of Comparative Example c2 was prepared by the same process as Example 2 except for using 70 grams of Nipol IR2200 instead of LHIR-80 at Step 1.

Comparative Example c3

The rubber composition of Comparative Example c3 was prepared by the same process as Example 3 except for using 90 grams of Nipol IR2200 instead of LHIR-80 at Step 1.

Comparative Example c4

The rubber composition of Comparative Example c4 was prepared by the same process as Example 2 except for using 30 grams of EPT3091 (EPDM rubber manufactured by Mitsui Chemical) at Step 2, using 0.8 gram of PERHEXA (R) 25B at Step 5, and that the vulcanization temperature was 180 degree C. and the vulcanization period was 6 minutes at Step 7.

Comparative Example c5

The rubber composition of Comparative Example c5 was prepared by the same process as comparative example c4 except for using 90 grams of LHIR-80 at Step 1 and using 10 grams of EPT3091 at Step 2.

Comparative Example c6

The rubber composition of Comparative Example c6 was prepared by the same process as Example 2 except for using 70 grams of Cariflex IR0307 (lithium-catalyzed, low-cis isoprene rubber manufactured by Kraton Polymers) instead of LHIR-80 at Step 1, using 30 grams of EPT3091 at Step 2, using 0.8 gram of PERHEXA(R) 25B at Step 5, and that the vulcanization temperature was 180 degree C. and the vulcanization period was 6 minutes at Step 7.

Comparative Example c7

The rubber composition of Comparative Example c7 was prepared by the same process as Comparative Example c6 except for using 90 grams of Cariflex IR0307 at Step 1 and using 10 grams of EPT3091 at Step 2.

Comparative Examples c8 to c13

They were provided as mono-component polymer compositions. Comparative Examples c8 and c9 were made of neodymium-catalyzed high-cis polyisoprene rubber (LHIR-80 manufactured by Moaming Luhua). Comparative Examples c10 and c11 were made of lithium-catalyzed low-cis polyisoprene rubber (Cariflex IR0307 manufactured by Kraton Polymers). Comparative Examples c12 and c13 were made of non-neodymium-catalyzed high-cis polyisoprene (Nipol IR2200 manufactured by ZEON).

In summary, 100 grams of each rubber component was used; and 0.5 gram of Irganox 1726 was added only in Comparative Examples c9, c11, and c13. The process was the same as Example 1 except for omitting Step 2, using 0.8 gram of PERHEXA(R) 25B at Step 5, and that the vulcanization period was 10 minutes at Step 7.

In particular, comparative examples c10 and c11 were degraded by heat after 72-hour heating at 70 degree C. Haze and TT were not able to be measured.

Reference Examples r1 to r8

Reference Examples r1 to r8 were prepared according to the disclosure of PCT/JP2014/051659 which was filed by the present Applicant and has not been published yet by the filing date of the present application. The novel rubber compositions of Reference Examples were made from a lithium-catalyzed, low-cis polyisoprene rubber (Cariflex IR0307 manufactured by Kraton Polymers). The Reference Examples were subjected to the same property tests as shown in the tables below. Manufacturing steps 1 to 7 were almost the same as the present Examples (see the tables below for details such as raw materials). Note that these Reference Examples were written herein just only for reference.

The results of Examples 1 to 8, Comparative Examples c1 to c13, and Reference Examples r1 to r8 are shown in the tables below.

TABLE 1

|  |  | Example # |  |  |  |  |  |
|---|---|---|---|---|---|---|---|
|  |  | 1 | c1 | r1 | 2 | c2 | r2 |
| Components | LHIR-80 | 50 |  |  | 70 |  |  |
|  | Cariflex IR307 |  |  | 50 |  |  | 70 |
|  | Nipol IR220 |  | 50 |  |  | 70 |  |
|  | RB-810 |  |  |  |  |  |  |
|  | RB-820 | 50 | 50 | 50 | 30 | 30 | 30 |
|  | RB-830 |  |  |  |  |  |  |
|  | Diene-NF35NR |  |  |  |  |  |  |
|  | EPT3091 |  |  |  |  |  |  |
|  | Lauric acid | 0.25 | 0.25 | 0.25 | 0.25 | 0.25 | 0.25 |
|  | Irganox 1726 |  |  |  |  |  |  |
|  | Perhexa 25B | 0.5 | 0.5 | 0.5 | 0.5 | 0.5 | 0.5 |
|  | Total | 100.75 | 100.75 | 100.75 | 100.75 | 100.75 | 100.75 |
| Sheet | Cure Temp (° C.) | 160 | 160 | 160 | 160 | 160 | 160 |
|  | Cure Time (min.) | 6 | 6 | 6 | 9 | 9 | 9 |
| Room Temp. | Haze (%) | 9 | 50 | 4 | 13 | 61 | 4 |
|  | TT (%) | 90 | 87 | 91 | 89 | 85 | 91 |
|  | Hs, A 0 sec | 63 | 65 | 63 | 47 | 48 | 47 |
|  | Hs, A 30 sec | 57 | 58 | 57 | 42 | 45 | 41 |
|  | Tb (MPa) | 9.0 | 10.6 | 7.1 | 2.5 | 4.3 | 2.4 |
|  | M100 (MPa) | 2.4 | 2.3 | 2.5 | 1.5 | 1.5 | 1.6 |
|  | M300 (MPa) | 5.3 | 4.4 | 5.9 | — | — | — |
|  | M500 (MPa) | — | 9.3 | — | — | — | — |
|  | Eb (%) | 402 | 537 | 330 | 208 | 271 | 170 |
|  | Tear (N/mm) | 27 | 34 | 22 | 15 | 26 | 12 |
| 70° C., 24 hrs | Haze (%) | 10 | 51 | 4 | 15 | 62 | 5 |
|  | TT (%) | 89 | 87 | 91 | 88 | 85 | 91 |
|  | Hs, A 0 sec. | 60 | 62 | 60 | 46 | 47 | 48 |
|  | Hs, A 30 sec. | 56 | 57 | 56 | 43 | 44 | 44 |
|  | Tb (MPa) | 8.1 | 8.5 | 7.6 | 2.7 | 3.1 | 2.7 |
|  | M100 (MPa) | 2.5 | 2.5 | 2.7 | 1.5 | 1.5 | 1.6 |
|  | M300 (MPa) | 6.4 | 5.4 | 5.3 | — | — | — |
|  | M500 (MPa) | — | — | — | — | — | — |
|  | Eb (%) | 343 | 421 | 310 | 215 | 256 | 178 |
|  | Tear (N/mm) | 30 | 36 | 27 | 19 | 24 | 11 |
| 70° C., 48 hrs | Haze (%) | 10 | 51 | 5 | 15 | 62 | 6 |
|  | TT (%) | 89 | 87 | 91 | 89 | 85 | 90 |
|  | Hs, A 0 sec. | 61 | 62 | 60 | 46 | 46 | 47 |
|  | Hs, A 30 sec. | 56 | 57 | 56 | 43 | 44 | 44 |
|  | Tb (MPa) | 8.2 | 10.0 | 7.3 | 2.7 | 3.4 | 2.6 |
|  | M100 (MPa) | 2.6 | 2.5 | 2.7 | 1.5 | 1.5 | 1.6 |
|  | M300 (MPa) | 6.3 | 5.7 | 4.9 | — | — | — |
|  | M500 (MPa) | — | — | — | — | — | — |
|  | Eb (%) | 355 | 452 | 310 | 210 | 270 | 167 |
|  | Tear (N/mm) | 30 | 33 | 27 | 18 | 23 | 14 |
| 70° C., 72 hrs | Haze (%) | 10 | 52 | 5 | 14 | 62 | 6 |
|  | TT (%) | 89 | 87 | 91 | 90 | 85 | 90 |
|  | Hs, A 0 sec. | 61 | 62 | 60 | 46 | 46 | 46 |
|  | Hs, A 30 sec. | 56 | 57 | 56 | 43 | 44 | 43 |
|  | Tb (MPa) | 6.8 | 9.5 | 6.7 | 2.5 | 3.3 | 2.5 |
|  | M100 (MPa) | 2.5 | 2.5 | 2.5 | 1.5 | 1.4 | 1.5 |
|  | M300 (MPa) | 5.9 | 5.7 | 6.0 | — | — | — |
|  | M500 (MPa) | — | — | — | — | — | — |
|  | Eb (%) | 331 | 429 | 327 | 193 | 265 | 167 |
|  | Tear (N/mm) | 27 | 31 | 28 | 17 | 24 | 11 |

TABLE 2

|  |  | Example # |  |  |  |  |
|---|---|---|---|---|---|---|
|  |  | 3 | c3 | r3 | 4 | r4 |
| Components | LHIR-80 | 90 |  |  | 30 |  |
|  | Cariflex IR307 |  |  | 90 |  | 30 |
|  | Nipol IR220 |  | 90 |  |  |  |
|  | RB-810 | 10 | 10 | 10 |  |  |
|  | RB-820 |  |  |  | 70 | 70 |
|  | RB-830 |  |  |  |  |  |
|  | Diene-NF35NR |  |  |  |  |  |

TABLE 2-continued

|  |  | Example # | | | | |
|---|---|---|---|---|---|---|
|  |  | 3 | c3 | r3 | 4 | r4 |
|  | EPT3091 |  |  |  |  |  |
|  | Lauric acid | 0.25 | 0.25 | 0.25 | 0.25 | 0.25 |
|  | Irganox 1726 |  |  |  |  |  |
|  | Perhexa 25B | 0.8 | 0.8 | 0.8 | 0.5 | 0.5 |
|  | Total | 101.05 | 101.05 | 101.05 | 100.75 | 100.75 |
| Sheet | Cure Temp (° C.) | 160 | 160 | 160 | 160 | 160 |
|  | Cure Time (min.) | 10 | 10 | 10 | 6 | 6 |
| Room Temp. | Haze (%) | 15 | 70 | 4 | 6 | 4 |
|  | TT (%) | 88 | 82 | 91 | 90 | 91 |
|  | Hs, A 0 sec | 30 | 30 | 30 | 76 | 76 |
|  | Hs, A 30 sec | 29 | 28 | 27 | 71 | 71 |
|  | Tb (MPa) | 3.3 | 3.5 | 2.4 | 10.1 | 8.1 |
|  | M100 (MPa) | 0.6 | 0.6 | 0.6 | 4.1 | 3.9 |
|  | M300 (MPa) | 1.5 | 1.2 | 1.5 | — | — |
|  | M500 (MPa) | — | — | — | — | — |
|  | Eb (%) | 418 | 497 | 397 | 253.0 | 242.0 |
|  | Tear (N/mm) | NB(19) | NB(18) | 16.0 | 21 | 20 |
| 70° C., 24 hrs | Haze (%) | 16 | 70 | 4 | — | — |
|  | TT (%) | 88 | 82 | 91 | — | — |
|  | Hs, A 0 sec. | 30 | 31 | 31 | — | — |
|  | Hs, A 30 sec. | 29 | 29 | 29 | — | — |
|  | Tb (MPa) | 3.3 | 3.2 | 1.7 | — | — |
|  | M100 (MPa) | 0.6 | 0.6 | 0.6 | — | — |
|  | M300 (MPa) | 1.4 | 1.4 | 1.5 | — | — |
|  | M500 (MPa) | — | — | — | — | — |
|  | Eb (%) | 447 | 442 | 323 | — | — |
|  | Tear (N/mm) | NB(17) | NB(19) | 14 | — | — |
| 70° C., 48 hrs | Haze (%) | 16 | 70 | 3 | — | — |
|  | TT (%) | 88 | 82 | 91 | — | — |
|  | Hs, A 0 sec. | 30 | 31 | 29 | — | — |
|  | Hs, A 30 sec. | 28 | 29 | 25 | — | — |
|  | Tb (MPa) | 2.9 | 2.8 | 1.4 | — | — |
|  | M100 (MPa) | 0.6 | 0.6 | 0.5 | — | — |
|  | M300 (MPa) | 1.4 | 1.4 | 1.2 | — | — |
|  | M500 (MPa) | — | — | — | — | — |
|  | Eb (%) | 415 | 413 | 315 | — | — |
|  | Tear (N/mm) | NB(18) | NB(18) | 9 | — | — |
| 70° C., 72 hrs | Haze (%) | 16 | 17 | Degradation | — | — |
|  | TT (%) | 88 | 82 | — | — | — |
|  | Hs, A 0 sec. | 30 | 30 | 29 | — | — |
|  | Hs, A 30 sec. | 28 | 28 | 18 | — | — |
|  | Tb (MPa) | 2.5 | 2.9 | 0.5 | — | — |
|  | M100 (MPa) | 0.5 | 0.6 | 0.4 | — | — |
|  | M300 (MPa) | 1.3 | 1.4 | — | — | — |
|  | M500 (MPa) | — | — | — | — | — |
|  | Eb (%) | 413 | 427 | 155 | — | — |
|  | Tear (N/mm) | NB(15) | NB(16) | 4 | — | — |

TABLE 3

|  |  | Example # | | | | | | | |
|---|---|---|---|---|---|---|---|---|---|
|  |  | 5 | r5 | 6 | r6 | 7 | r7 | 8 | r8 |
| Components | LHIR-80 | 50 |  | 70 |  | 50 |  | 70 |  |
|  | Cariflex IR307 |  | 50 |  | 70 |  | 50 |  | 70 |
|  | Nipol IR220 |  |  |  |  |  |  |  |  |
|  | RB-810 |  |  |  |  |  |  |  |  |
|  | RB-820 |  |  |  |  |  |  |  |  |
|  | RB-830 | 50 | 50 | 30 | 30 |  |  |  |  |
|  | Diene-NF35NR |  |  |  |  | 50 | 50 | 30 | 30 |
|  | EPT3091 |  |  |  |  |  |  |  |  |
|  | Lauric acid | 0.25 | 0.25 | 0.25 | 0.25 | 0.25 | 0.25 | 0.25 | 0.25 |
|  | Irganox 1726 |  |  |  |  |  |  |  |  |
|  | Perhexa 25B | 0.5 | 0.5 | 0.5 | 0.5 | 0.8 | 0.8 | 0.8 | 0.8 |
|  | Total | 100.75 | 100.75 | 100.75 | 100.75 | 101.05 | 101.05 | 101.05 | 101.05 |
| Sheet | Cure Temp (°) | 160 | 160 | 160 | 160 | 160 | 160 | 160 | 160 |
|  | Cure Time (min) | 6 | 6 | 8 | 8 | 6 | 6 | 8 | 8 |

TABLE 3-continued

|  |  | Example # | | | | | | | |
|---|---|---|---|---|---|---|---|---|---|
|  |  | 5 | r5 | 6 | r6 | 7 | r7 | 8 | r8 |
| Room Temp. | Haze (%) | 10 | 5 | 13 | 4 | 11 | 3 | 12 | 3 |
|  | TT (%) | 89 | 91 | 89 | 91 | 90 | 91 | 88 | 91 |
|  | Hs, A 0 sec. | 66 | 67 | 51 | 50 | 36 | 35 | 34 | 33 |
|  | Hs, A 30 sec. | 62 | 63 | 46 | 45 | 31 | 30 | 28 | 28 |
|  | Tb (MPa) | 10.1 | 9.2 | 3.5 | 6 | 1.7 | 1.7 | 3.0 | 2 |
|  | M100 (MPa) | 3.1 | 3.1 | 1.9 | 1.9 | 0.8 | 0.7 | 0.7 | 0.7 |
|  | M300 (MPa) | 6 | 6.1 | — | 4.2 | 1.4 | 1.4 | 1.6 | 1.4 |
|  | M500 (MPa) | — | — | — | — | — | — | — | — |
|  | Eb (%) | 440 | 400 | 256 | 362 | 335 | 386 | 385 | 403 |
|  | Tear (N/mm) | 43 | 37 | 32 | 21 | 13 | 10 | 14 | 11 |

TABLE 4

|  |  | Example # | | | |
|---|---|---|---|---|---|
|  |  | c4 | c5 | c6 | c7 |
| Components | LHIR-80 | 70 | 90 |  |  |
|  | Cariflex IR307 |  |  | 70 | 90 |
|  | Nipol IR220 |  |  |  |  |
|  | RB-810 |  |  |  |  |
|  | RB-820 |  |  |  |  |
|  | RB-830 |  |  |  |  |
|  | Diene-NF35NR |  |  |  |  |
|  | EPT3091 | 30 | 10 | 30 | 10 |
|  | Lauric acid | 0.25 | 0.25 | 0.25 | 0.25 |
|  | Irganox 1726 |  |  |  |  |
|  | Perhexa 25B | 0.8 | 0.8 | 0.8 | 0.8 |
|  | Total | 101.05 | 101.05 | 101.05 | 101.05 |
| Sheet | Cure Temp (° C.) | 180 | 180 | 180 | 180 |
|  | Cure Time (min.) | 6 | 6 | 6 | 6 |
| Room Temp. | Haze (%) | 95 | 95 | 95 | 95 |
|  | TT (%) | 39 | 56 | 37 | 54 |
|  | Hs, A 0 sec | 37 | 31 | 37 | 32 |
|  | Hs, A 30 sec | 32 | 28 | 32 | 29 |
|  | Tb (MPa) | 13.7 | 6.4 | 12.1 | 8.7 |
|  | M100 (MPa) | 0.7 | 0.7 | 0.7 | 0.6 |
|  | M300 (MPa) | 1.5 | 1.5 | 1.5 | 1.4 |
|  | M500 (MPa) | 3.4 | 4.1 | 3.0 | 3.0 |
|  | Eb (%) | 633 | 531 | 660 | 607 |
|  | Tear (N/mm) | 18 | 17 | 17 | 17 |

TABLE 5

|  |  | Example # | | | | | |
|---|---|---|---|---|---|---|---|
|  |  | c8 | c9 | c10 | c11 | c12 | c2 |
| Components | LHIR-80 | 100 | 100 |  |  |  |  |
|  | Cariflex IR307 |  |  | 100 | 100 |  |  |
|  | Nipol IR220 |  |  |  |  | 100 | 100 |
|  | RB-810 |  |  |  |  |  |  |
|  | RB-820 |  |  |  |  |  |  |
|  | RB-830 |  |  |  |  |  |  |
|  | Diene-NF35NR |  |  |  |  |  |  |
|  | EPT3091 |  |  |  |  |  |  |
|  | Lauric acid | 0.25 | 0.25 | 0.25 | 0.25 | 0.25 | 0.25 |
|  | Irganox 1726 |  | 0.5 |  | 0.5 |  | 0.5 |
|  | Perhexa 25B | 0.8 | 0.8 | 0.8 | 0.8 | 0.8 | 0.8 |
|  | Total | 101.05 | 101.55 | 101.05 | 101.55 | 101.05 | 101.55 |
| Sheet | Cure Temp (° C.) | 160 | 160 | 160 | 160 | 160 | 160 |
|  | Cure Time (min.) | 10 | 10 | 10 | 10 | 10 | 10 |
| Room Temp. | Haze (%) | 15 | 14 | 3 | 3 | 72 | 72 |
|  | TT (%) | 88 | 89 | 91 | 92 | 82 | 82 |
|  | Hs, A 0 sec | 26 | 25 | 26 | 25 | 26 | 25 |
|  | Hs, A 30 sec | 22 | 21 | 21 | 20 | 23 | 21 |
|  | Tb (MPa) | 6.8 | 7.4 | 6.5 | 5.0< | 6.7 | 5.7 |
|  | M100 (MPa) | 0.5 | 0.4 | 0.5 | 0.4 | 0.5 | 0.4 |
|  | M300 (MPa) | 0.9 | 0.8 | 0.9 | 0.7 | 0.8 | 0.7 |
|  | M500 (MPa) | 1.5 | 1.3 | 1.5 | 1.2 | 1.2 | 1.0 |
|  | Eb (%) | 705 | 800 | 798 | 911< | 733 | 813 |
|  | Tear (N/mm) | 15 | 15 | 16.0 | 16 | 16 | 13 |
| 70° C., 24 hrs | Haze (%) | 16 | 15 | 4 | 4 | 72 | 74 |
|  | TT (%) | 88 | 87 | 91 | 91 | 83 | 81 |
|  | Hs, A 0 sec. | 27 | 27 | 27 | 27 | 27 | 27 |
|  | Hs, A 30 sec. | 23 | 22 | 22 | 22 | 23 | 22 |
|  | Tb (MPa) | 7.8 | 7.5 | 9.5< | 4.7< | 7.5 | 5.1 |
|  | M100 (MPa) | 0.4 | 0.4 | 0.5 | 0.4 | 0.5 | 0.4 |
|  | M300 (MPa) | 0.8 | 0.7 | 0.9 | 0.7 | 0.8 | 0.7 |
|  | M500 (MPa) | 1.3 | 1.1 | 1.6 | 1.1 | 1.2 | 1.0 |
|  | Eb (%) | 816 | 802 | 800< | 908 | 739 | 762 |
|  | Tear (N/mm) | 15 | 14 | 15 | 16 | 15 | 12 |

TABLE 5-continued

|  |  | Example # | | | | | |
|---|---|---|---|---|---|---|---|
|  |  | c8 | c9 | c10 | c11 | c12 | c2 |
| 70° C., 48 hrs | Haze (%) | 17 | 16 | 3 | 3 | 74 | 75 |
|  | TT (%) | 88 | 87 | 91 | 91 | 82 | 80 |
|  | Hs, A 0 sec. | 26 | 25 | 24 | 22 | 27 | 26 |
|  | Hs, A 30 sec. | 23 | 20 | 20 | 13 | 24 | 24 |
|  | Tb (MPa) | 5.4 | 4.4 | 7.4 | 3.1< | 5.8 | 6.0 |
|  | M100 (MPa) | 0.4 | 0.4 | 0.4 | 0.3 | 0.5 | 0.4 |
|  | M300 (MPa) | 0.8 | 0.6 | 0.8 | 0.5 | 0.9 | 0.7 |
|  | M500 (MPa) | 1.4 | 1.0 | 1.3 | 0.8 | 1.3 | 1.1 |
|  | Eb (%) | 718 | 783 | 823 | 925 | 673 | 765 |
|  | Tear (N/mm) | 15 | 12 | 15 | 12 | 15 | 13 |
| 70° C., 72 hrs | Haze (%) | 17 | 17 | Degradation | Degradation | 73 | 75 |
|  | TT (%) | 87 | 87 | — | — | 82 | 85 |
|  | Hs, A 0 sec. | 24 | 24 | 12 | 19 | 26 | 26 |
|  | Hs, A 30 sec. | 20 | 19 | 7 | 12 | 24 | 21 |
|  | Tb (MPa) | 2.3 | 3.9 | 3.8 | 1.9 | 4.9 | 5.4 |
|  | M100 (MPa) | 0.3 | 0.3 | 0.2 | 0.3 | 0.5 | 0.4 |
|  | M300 (MPa) | 0.5 | 0.6 | 0.4 | 0.4 | 0.8 | 0.7 |
|  | M500 (MPa) | 0.9 | 0.9 | 0.6 | 0.6 | 1.2 | 1.0 |
|  | Eb (%) | 683 | 801 | 827 | 885 | 696 | 958 |
|  | Tear (N/mm) | 9 | 11 | 13 | 9 | 15 | 12 |

The Working Examples exerted the combination of excellent properties such as haze and Type A Durometer Hardness. In contrast, the Comparative Examples had defects in some properties.

In particular, Comparative Examples c1 to c3 had poor haze and TT and were not able to exert desired transparency, although they used Nipol IR2200 which is high-cis polyisoprene. The fact clearly supports the surprising effect obtained from the neodymium-catalyzed isoprene.

Comparative Examples c4 to c7 were fairly opaque. EPT3091 itself is a pure vulcanized EPDM rubber and has some transparency (haze: 14%, TT: 88%, refractive index at 23 degree C.: 1.48), but the mixture of EPT3091 and other material becomes opaque. The fact is due to the difference between the refractive indices of EPT3091 and polyisoprene (about 1.52), and the poor blendability of EPT3091 and polyisoprene. One cannot obtain the desired transparency by using EPDM, and the compositions according to the present embodiments are superior to the Comparative Examples.

Comparative Examples c8 to c13 show poor results on hardness or the like, even though they had somewhat good haze or TT. The fact means that the blend compositions according to the present embodiments have exerted the advantageous effects that cannot be obtained from the conventional mono-component polymers.

Example 8: Measurement of Metal Contents

The neodymium-catalyzed high-cis polyisoprene LHIR-80, which was used in Examples 1 to 7, was subjected to a measurement of trace metal elements. The measurement was carried out by an ICP/OES at the Intertek Polychemlab (Geleen, the Netherlands). The minimum limit of detection was 8 ppm.

The result of LHIR-80 was as below.
Al: 425 ppm
Nd: 690 ppm
Fe: n.a. (out of detection limit)
Ti: n.a.
Li: n.a.

Example 9: Measurement of Wet Gel Index

Gel content (wet gel index) of LHIR-80 (the neodymium-catalyzed, high-cis polyisoprene used in Examples 1 to 7; weight-average molecular weight Mw: 2100 kg/mol) was measured. The target rubber was dissolved in toluene, and the undissolved gel particles were filtered, according to the method defined in BMS P 35-88. The filtered gel particles were classified into levels of 0 to 9 ("0": no gel content; "9": large quantity of gel content). The sizes of gel particles were also classified into "A" (larger) or "B" (smaller).

The sample of LHIR-80 had "2B" to "3B" of wet gel content. The fact clearly supports the specific low amount of wet gel content in neodymium-catalyzed polyisoprene.

As a Comparative Example, Nipol 2200 (Ziegler-Natta catalyzed, high-cis polyisoprene manufactured by ZEON) was subjected to the same wet gel content measurement. Nipol 2200 had "2A" of wet get content. The result means that Nipol 2200 has more gel content than neodymium-catalyzed polyisoprene.

The invention claimed is:

1. A transparent, crosslinked rubber composition, comprising:
    a neodymium-catalyzed isoprene rubber (IR) component; and
    a rubber polymer component selected from the group consisting of butadiene rubber (BR), 1,2-polybutadiene rubber, and styrene butadiene rubber (SBR),
    wherein the amount of the neodymium-catalyzed isoprene rubber is from 5 to 95 mass parts, with the proviso that the total amount of the neodymium-catalyzed isoprene rubber and the rubber polymer component is 100 mass parts,
    wherein the composition is substantially free of silica,
    wherein the composition has haze of less than 20%, on 2 mm thick sheet, measured according to JIS K7136,
    wherein the composition has Type A Durometer hardness (0 sec) of 30 or more, measured according to JIS K6253;
    wherein the neodymium-catalyzed isoprene rubber has a cis content of 95% or more.

2. The composition according to claim 1, wherein the absolute value of the difference between the refractive indices of the neodymium-catalyzed isoprene rubber and the rubber polymer component is 0.100 or less.

3. The composition according to claim 1, wherein the rubber polymer component includes low-cis polybutadiene rubber.

4. The composition according to claim 1, wherein the rubber polymer component includes syndiotactic 1,2-polybutadiene rubber.

5. The composition according to claim 1, wherein the composition is substantially free of oil as a softener.

6. The composition according to claim 1, wherein the composition has Type A Durometer hardness (30 sec) which is 80% or more of the Type A Durometer hardness (0 sec), measured according to JIS K6253.

7. The composition according to claim 1, wherein the composition has Tear Strength of 10 N/mm or more, measured on a 2-mm sheet according to JIS K6252.

8. The composition according to claim 1, wherein the composition has Total Light Transmittance of 88% or more, measured according to JIS K7361-1.

9. The composition according to claim 1, wherein the composition has haze of less than 20%, on 2 mm thick sheet heated at 70 degree C. for 72 hours, measured according to JIS K7136.

10. The composition according to claim 1, wherein the neodymium-catalyzed isoprene rubber component includes 10,000 ppm or less of iron (in terms of metal iron), and/or 10,000 ppm or less of lithium (in terms of metal lithium).

11. A process for manufacturing a transparent, crosslinked rubber composition, being substantially free of silica, the process comprising the acts of:
   providing a neodymium-catalyzed isoprene rubber polymer having the refractive index of between 1.500 to 1.525 at 23 degree C.;
   providing a rubber polymer selected from the group consisting of butadiene rubber, 1,2-polybutadiene rubber, and styrene butadiene rubber, wherein the rubber polymer has the refractive index of between 1.500 to 1.525 at 23 degree C.;
   mixing the neodymium-catalyzed isoprene rubber polymer and the rubber polymer such that the amount of the neodymium-catalyzed isoprene rubber polymer is from 5 to 95 mass parts, with the proviso that the total amount of the neodymium-catalyzed isoprene rubber polymer and the rubber polymer is 100 mass parts, to obtain a mixture thereof;
   adding a crosslinker to the mixture; and
   uniformly kneading the mixture;
   wherein the neodymium-catalyzed isoprene rubber has a cis content of 95% or more.

12. The process according to claim 11, wherein the crosslinker is peroxide.

13. An article comprising the composition according to claim 1.

14. The article according to claim 13, wherein the article is selected from the group consisting of footwear, tires, clothes, rain gears, eyewear, medical goggles, masks, medical masks, medical air tents, toys, damping materials, building materials, coatings for wiring, packaging materials, protective members for computers, computer peripherals, contraceptive devices, sex toys, artificial nipples, paper diapers, stationery, containers, food trays, balls for sports, ball chairs, and protection films.

* * * * *